Sept. 29, 1942.　　　F. D. SLOUGH　　　2,297,081
PHONOGRAPH RECORD RACK
Filed Oct. 13, 1939　　　2 Sheets-Sheet 1

INVENTOR.
Frank D. Slough
BY
Frank D. Slough
ATTORNEY.

Sept. 29, 1942. F. D. SLOUGH 2,297,081
PHONOGRAPH RECORD RACK
Filed Oct. 13, 1939 2 Sheets-Sheet 2

INVENTOR.
Frank D. Slough
BY Frank M. Slough
ATTORNEY.

Patented Sept. 29, 1942

2,297,081

UNITED STATES PATENT OFFICE 2,297,081

PHONOGRAPH RECORD RACK

Frank D. Slough, Mentor, Ohio

Application October 13, 1939, Serial No. 299,293

8 Claims. (Cl. 211—40)

My invention relates to record racks, and relates more particularly to record racks adapted for home and other use, of users of phonographs employing disc records, and comprising a rack suitable for compactly receiving phonograph disc records during non-use periods thereof.

An object of my invention is to provide a rack of the above character, which can be inexpensively manufactured, and at the same time possessing qualities of high utility and being also of a high degree of aesthetic appearance.

Another object of my invention is to provide a rack of the above character, for compactly receiving a large number of disc phonograph records and permitting ready removal of said records, without liability of damage to said records.

Another object of my invention is to provide a record rack of the above character, which while being extremely light in weight, is adapted to receive a large number of records in compact relative disposition, and in the aggregate of considerable weight without being susceptible to distortion while supporting such weight.

Another object of my invention is to provide a record rack of the above character, which may be readily transported from place to place while carrying a relatively large number of records in place, and without damage to said rack or said records.

Another object of my invention is to provide a record rack of the above character, so formed that in shipping a large number of such racks, the same may be relatively nested for shipping a relatively large number in a relatively small container.

Other objects of my invention and the invention itself will be better understood by reference to the accompanying drawings illustrating a preferred embodiment of my invention, and to the following description wherein reference is made to said drawings, and wherein varying embodiments of the invention are disclosed.

Figures 4, 5, 6:
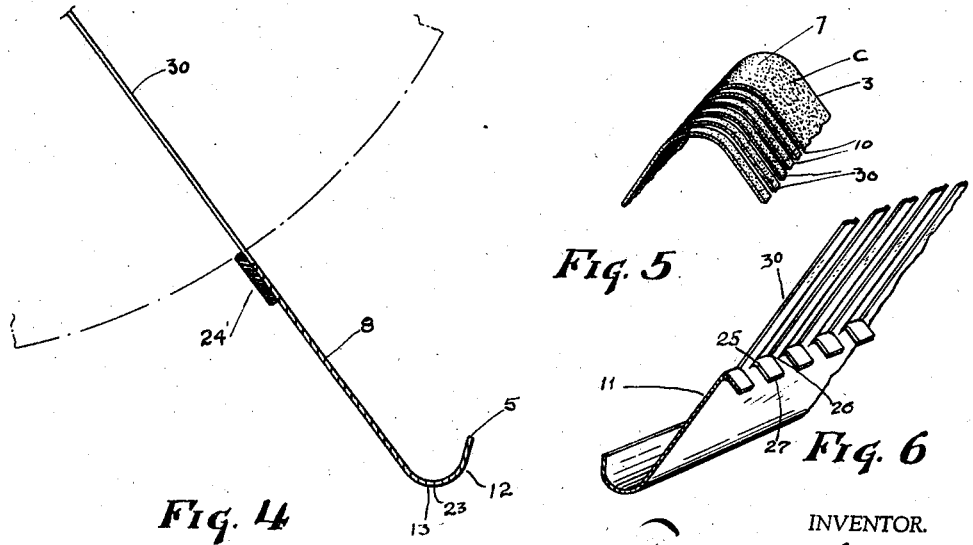

Fig. 4 is a fragmentary view of a transverse section illustrating a cushioning record rest means which may be advantageously applied to the record rack of the foregoing figures; and Fig. 5 is a fragmentary view of merely the ridge portion to indicate a coating of cushioning material which is preferably applied to the surfaces of the record rack of my invention; and Fig. 6 is a fragmentary view of another embodiment of my invention.

Referring now to the different figures of drawing, in which like parts are designated by like reference characters, and which illustrate a preferred embodiment of my invention, at 2 is illustrated a relatively thin sheet of steel or like material, originally of rectangular form, bounded by straight oppositely disposed end edges 3 and 4, and side edges 5 and 6, said sheet being then preferably substantially abruptly given a medial bend at 7, extending from end to end of the sheet to dispose the side walls 8 and 9 in relative angular relation.

Although my invention is applicable to the making of record racks for any desired size of phonograph disc records, and whereas the invention is applicable to embodiments permitting a very considerable variation in the sizes of records to be received in the said rack, the accompanying description will proceed as being for an embodiment of my invention constructed of such size and relative angular disposition of the walls 8 and 9 as will be most suitable for records varying from 8" to 12" in diameter, although it will be understood that this same rack may readily be employed for records as small as 6" in diameter, without alteration, and at the same time will receive records at least 15" in diameter.

However, it is the common practice to make records of merit nearly entirely in the standard sizes of 10" and 12".

Such records are commonly made within a small range of thicknesses, i. e., they are of approximately the same thickness, but slight differences in thicknesses and slight differences in diameters, even for a given rated size, are encountered, and at the same time records which have been kept for some time and which may have been exposed to warping pressure under temperature conditions which may occasionally be achieved on hot days, or from a nearby heating radiator or the like, sometimes become warped, and the record rack of my invention contemplates receiving records having slight variations in effective diameters and thicknesses, in the same rack within the range of sizes above indicated.

Figure 2:
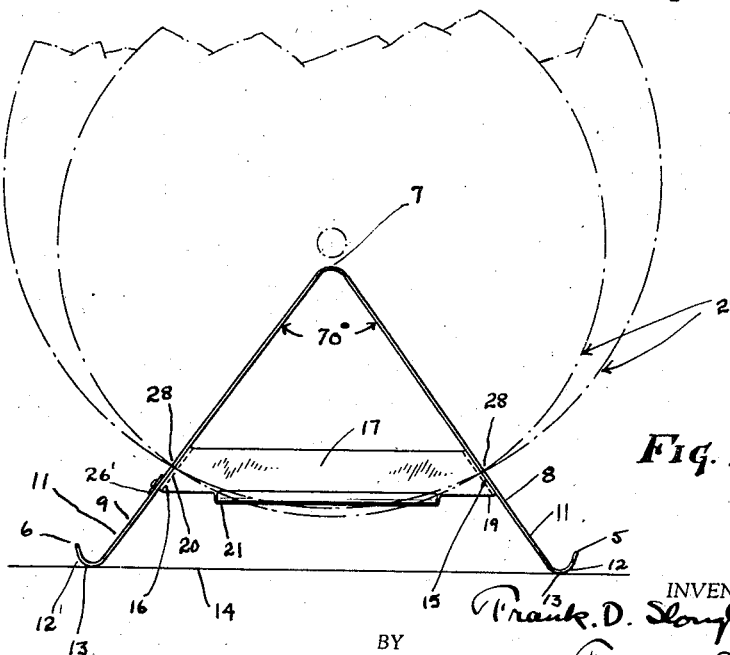
Fig. 2 illustrates an end elevational view thereof.

Although the record rack illustrated in the drawings may be made, also, in varying sizes, a common size of great utility under present conditions in the art is one wherein the two walls 8 and 9 extend angularly relative to each other at an angle substantially less than 90° and in the embodiment shown being approximately 70°. It will be understood, however, that for records of larger sizes the angle would be greater, but in every case must be substantially less than 180°, and in order for the record rack to carry, for instance, a range of record sizes from 10" to 12" the angle as indicated in Fig. 2 should not be, for practical purposes, in excess of 135°.

For the purpose of compactness and general utility, and to increase the range of record sizes which may be received, the angular relation indicated on the drawings, of 70°, appears to me to be very satisfactory.

Preferably prior to providing the medial bend 7 in the process of manufacturing my improved rack, narrow transverse slots 10 are provided, and I find that for records of the common thicknesses, in a record rack such as that illustrated, wherein the sheet has a length between the end edges 3 and 4 of approximately 14⅛", and the portion of such length occupied by the slots and intervening strips of metal 30, being about 12⅜", this distance of 12⅜" may be divided into ninety-nine equal widths for slots and strips; in other words, into fifty slots and forty-nine intervening strips, all of substantially the same width, each of said slots and each of said strips being thereby of a width of about ⅛ of an inch.

Records of the common sizes are commonly under ⅛" in thickness, so that they would be readily and loosely received within the slots of the rack of my invention, with a sufficient margin to more than take care of variations in thickness and slightly warped records, even when the cushioning coating is applied to the strips which intervene between each pair of slots, as hereinafter described.

Each of the slots, when applied to the flat sheet blank, is preferably of a length of 9½", and when the blank has been given the medial bend, the ends of said slots are approximately spaced about 5⅝" apart.

The initial blank width for the example herein described is about 15". The slots in the formed blank extending preferably to equal distances down the walls 8 and 9, leave an unslotted border portion 11 of approximately 2¾", whereof about ¾" at the extreme bottom edges is arcuately turned, as indicated, in the making of reverse bends at 12, to provide the rack with lateral grooved supporting surfaces at 13, adapted to rest upon the top surface 14 of a table, phonograph or radio shelf, or the like, upon which the rack is to be placed.

Between the walls 8 and 9, and preferably joined to the inner surfaces within the edges 3 and 4, at 15 and 16 I provide a pair of preferably sheet metal braces 17 and 18, said braces being provided with end flanges 19 and 20, by which the supports 17 and 18 are secured to the side walls 8 and 9 by riveting, or preferably by spot-welding. The braces 17 and 18 are preferably provided with pendant upwardly turned arcuately formed handle portions 21 and 22 having longitudinally extending concave under surfaces 23.

The upturned supporting portions 12 and 13 of the walls 8 and 9 provide a suitable channel-shaped receptacle for phonograph reproducer needles, pencils, or the like, as do also the similarly formed handle portions 21 and 22.

As indicated in Fig. 5, showing a fragment of the crest or medial ridge portion of my improved record rack, after the rack is formed as above described, a cushioning coating, indicated at C, is adhesively applied to all surfaces of the rack, whereby a cushioning coating, preferably ornamental, is provided, such coating with respect to the side edges of the sheet metal bordering the slots 10, including the strips 30, performing the highly advantageous function of preventing scratching of the composition disc records placed within the slots.

I find that for this purpose a coating process well known in the mechanical decorative arts as "flocking" is highly efficacious, such coating comprising an adhesive and relatively short fibers or threads of wool or like fabric material applied by an air blower, whereby a blast of air conveying the short fibers or threads of wool or like material are blown onto the adhesive-coated metal parts of the rack, and then passed through a drier, whereby the wool fabric or like coating material covers the entire exterior surfaces of all of the parts, penetrating to the surfaces bordering the slots, and all other parts.

Preferably these fibers of material are of any desired color, such as blue, which substantially adds to the decorative effect of the rack.

As illustrated in Fig. 6, the slots might extend in the form of slits 25 and 26 into the unslotted border portion 11 whereby a flange portion 27 is provided which can be turned either inwardly or outwardly with relation to the intervening strips 30 and the border portion 11. In the form shown in Fig. 6 the flange is bent inwardly of the border portion 11.

It is to be noted that the flange portion 27 thus provided extends the area upon which the record might rest when the record is in the furthest receptive position.

It may be said that however efficacious the rack may be in utilitarian aspects, sale of the same can not be effectively accomplished in substantial quantities unless the same is of highly aesthetic appearance, since these racks are commonly used by music lovers having highly developed aesthetic tastes.

The "flocking" surfaces thus provided provide not only a cushioning non-abrasive effect on the surface of the records, but also the fibers traversing the record-playing surfaces during insertion and removal of records effectually clean such surfaces of dust and other particles which otherwise collect in the playing grooves of the records, and, as each record from time to time, is inserted in the rack indifferently as to rotative position, ordinarily all playing surfaces of the records, on both sides thereof, and periodically cleaned by the action of the "flocking" on the edge portions of the strips during insertion and removal of records to and from the rack.

Subsequent to the "flocking" operation, I preferably apply rubber strips 24' and 25', one to the inner surface of each of the walls 8 and 9, by gluing, riveting, or otherwise securing said strips thereto, the use of glue or other adhesive being preferable because of its simplicity and low cost, and where the rubber strips are adhesively applied, this is preferably done subsequent to the "flocking" operation, since penetration of the fibers into the adhesive material provides a very efficacious adhesive bonding between the metal side walls 8 and 9 of the rack and the rubber strips 24 and 25.

Also, subsequent to the "flocking" operation, an indicia strip plate 26' is secured to one side wall, as 9, of the rack by means of rivets 27', or in any other suitable manner, said plate being of sheet metal such as German silver, or it may be of Celluloid, or any other suitable material.

Figure 1:
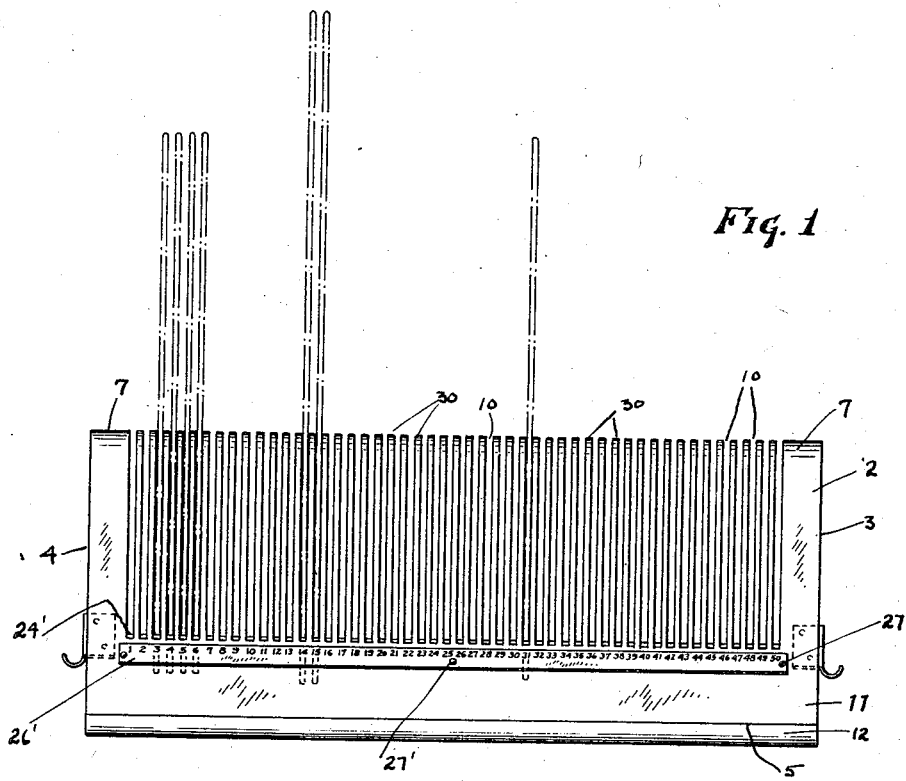
Fig. 1 illustrates a side elevational view of an embodiment of my invention.
Figure 3:
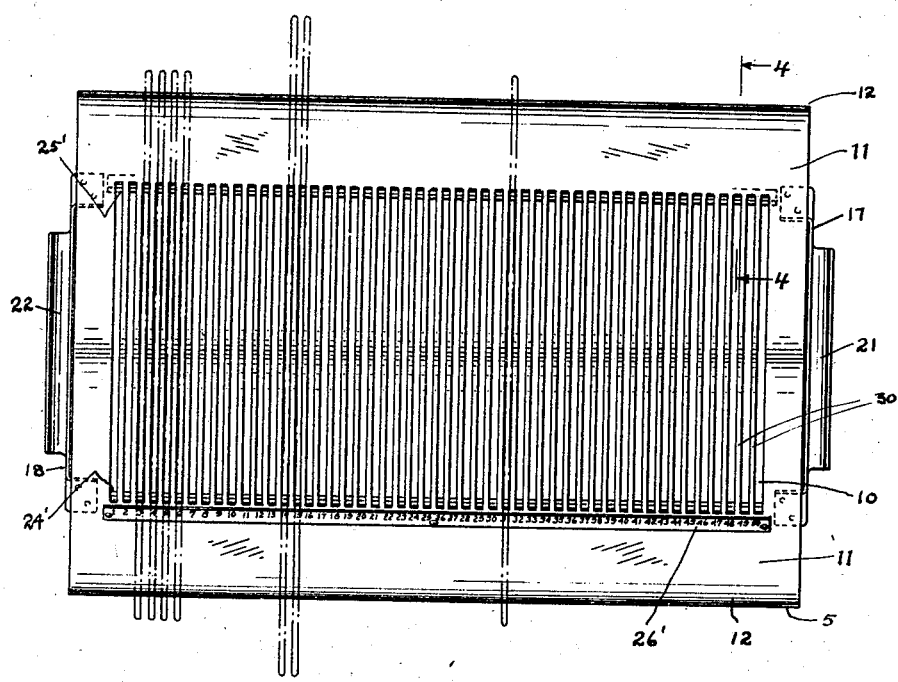
Fig. 3 illustrates a top plan view thereof.

The plate 26, placed immediately below an end of each of the slots 10, bears a numerical, alphabetical, or other indicia, such as the series of numbers 1, 2, 3, 4, etc., as shown in Figs. 1 and 3, to numerically or otherwise indicate the different record slots, whereby records correspondingly numbered may always be placed in the proper slots, and whereby an index record of phonograph record discs may be kept of each and every rack containing records, and said records may be thus readily located.

Records placed in the slots engage the rack, at 28, at two spaced portions of their peripheries, and as in the example described, substantially 5⅝" apart, a sector of the record being thereby housed within and between the walls 8 and 9, and a chordal border portion of the record extending below the level of the points 28, but above the surface 14 of the table or other surface on which the record rack may rest.

The rack so constructed, in the complete form described, by metal piercing and metal bending operations, is now ready for use and records may then be inserted and removed from the slots.

Records are preferably removed by placing a finger against an outwardly extending lower surface, such as indicated at 29 for the two sizes of records indicated in Fig. 2, and then are rolled by pressure applied to said records, for instance, in the direction of the ridge 27, whereby the records will roll slightly upwardly and laterally outwardly from the more distant points 28, upon which they will rest during the rolling, and then may be grasped from the remote side of the rack and lifted entirely out of the rack slot.

Thus, adjacent records of the same size may be readily removed in a simple manner, to avoid the greater difficulty of removing such records by merely attempting to grasp the upper edge portion of a record and lifting it, which operation would be difficult in view of the close proximity of other records of the same size.

A slight movement of the record, in the manner described, causes such record to project upwardly and outwardly from adjacent records, so that it may be grasped for ready removal, and in fact the rolling may be continued until a considerable portion of the record emerges beyond the plane of the other adjacent records of the same size.

Having thus described my invention in a preferred embodiment, and according to the example herein illustrated, I am aware that numerous and extensive departures may be made from the embodiment illustrated and example described, but without departing from the spirit of my invention and the scope of the appended claims.

I claim:

1. A disc phonograph record rack comprising a medially bent sheet of metal providing a pair of substantially planular divergent walls with an uppermost ridge at the junction of and forming a continuation of the walls, said sheet being provided with a series of elongated parallel spaced narrow perforations each of sufficient width to receive the thickness of a phonograph disc record, said perforations extending transversely across said ridge and adjacent portions of said walls, the lower border portions of each said wall being reversely bent to provide a pair of laterally spaced parallel supporting base portions for the perforated wall and ridge portions, said walls adjacent the ends of said perforations being so spaced as to be susceptible of subtending such an arc of the circumference of records of ordinary sizes inserted into said perforations which is substantially less than a half circle, and a layer of cushioning material applied to the outer and side edge surfaces of the portions of said sheet bordering said perforations.

2. A rack for phonograph records of the disc type, comprising a single sheet of relatively thin sheet metal coated with a cushioning material, said sheet bent along an intermediate portion to provide two downwardly divergent walls and an intermediate joining ridge, said ridge and portions of the downward walls being provided with a series of slots with intervening metal strips between the slots, the lowermost terminal portion of said walls providing supporting surface contacting engaging portions, said slots terminating above the lowermost supporting portion of said walls, said slots each receiving a disc record, the metal surfaces bordering the ends of said slots providing two points of supporting contact with each said record, and the coating of cushioning material providing fabric record engaging surfaces for records placed within said slots, whereby said fabric material may cushion said records and clean the playing surfaces thereof during placement and removal of said records.

3. A disc phonograph record rack comprising a medially bent sheet providing a pair of substantially planular divergent walls with an uppermost ridge at the junction of and forming a continuation of the walls, said sheet having a perforated portion in the central area of the sheet to provide a series of straight elongated parallel spaced narrow perforations each of sufficient width to receive the thickness of a phonograph disc record, said perforations extending transversely across said ridge and adjacent portions of said walls, said walls adjacent the ends of said perforations being so spaced as to be susceptible of subtending such an arc of the circumference of records of ordinary sizes inserted into said perforations which is substantially less than a half circle, the portions of said sheet providing the lateral long sides of the perforations being provided with a layer of cushioning record brushing material secured thereto.

4. A disc phonograph record rack comprising a medially bent sheet of metal providing a pair of substantially planular divergent walls with an uppermost ridge at the junction of and forming a continuation of the walls, said sheet being provided with a series of elongated parallel spaced narrow perforations each of sufficient width to receive the thickness of a phonograph disc record, said perforations extending transversely across said ridge and adjacent portions of said walls, the lower border portions of each said wall providing a pair of laterally spaced parallel supporting base portions for the perforated wall and ridge portions, said walls adjacent the ends of said perforations being so spaced as to be susceptible of subtending such an arc of the circumference of records of ordinary sizes inserted into said perforations which is substantially less than a half circle, and a layer of cushioning material applied to the outer and side edge surfaces of the portions of said sheet bordering said perforations.

5. A rack for storage of disc type phonograph records of substantially varying diameters, essentially unitarily formed of a plate of metallic or substantially equivalent material and having formed therein a plurality of straight narrow elongated relatively parallel slot openings extending longitudinally of the plate, said plate bent transversely of said slots medially of their longitudinal extent, to provide a pair of divergent walls with said openings extending upwardly of each said wall and across the transverse region of bending, said openings being laterally separated by intervening narrow strips of said plate material, the portions of said plate walls disposed longitudinally beyond the ends of the openings providing a base portion supporting the slotted portions of the plate, said rack comprising a layer of cushioning material affixed at least to the lateral edge portions of said strips, said rack adapted to receive a disc record in each said slot opening, with the record engaging, by peripheral edge portions thereof which are relatively spaced apart substantially less than a half circle, with record supporting elements of the rack at the two ends of the slot and disposed in the plane thereof.

6. A disc phonograph record rack comprising a medially bent sheet of metal providing a pair of substantially planular divergent walls with an uppermost ridge at the junction of and forming a continuation of the walls, said sheet being provided with a series of elongated parallel spaced narrow perforations each of sufficient width to receive the thickness of a phonograph disc record, said perforations extending transversely across said ridge and adjacent portions of said walls and means for supporting on a flat surface said bent plate in inverted V position, said walls adjacent the ends of said perforations being so spaced as to be susceptible of subtending such an arc of the circumference of records of ordinary sizes inserted into said perforations which is substantially less than a half circle, and a layer of cushioning material applied to the outer and side edge surfaces of the portions of said sheet bordering said perforations.

7. A rack for storage of disc type phonograph records of substantially varying diameters, essentially unitarily formed of a plate of metallic or substantially equivalent material and having formed therein a plurality of straight narrow elongated relatively parallel slot openings extending longitudinally of the plate, said plate bent transversely of said slots medially of their longitudinal extent, to provide a pair of divergent walls with said openings extending upwardly of each said wall and across the transverse region of bending, said openings being laterally separated by intervening narrow strips of said plate material, and means for supporting on a flat surface said bent plate in inverted V position, said rack comprising a layer of cushioning material affixed at least to the lateral edge portions of said strips, said rack adapted to receive a disc record in each said slot opening, with the record engaging, by peripheral edge portions thereof which are relatively spaced apart substantially less than a half circle, with record supporting elements of the rack at the two ends of the slot and disposed in the plane thereof.

8. A rack for storage of disc type phonograph records of substantially varying diameters, essentially unitarily formed of a plate of metallic or substantially equivalent material and having formed therein a plurality of straight narrow elongated relatively parallel slot openings extending longitudinally of the plate, said plate bent transversely of said slots medially of their longitudinal extent, to provide a pair of divergent walls with said openings extending upwardly of each said wall and across the transverse region of bending, said openings being laterally separated by intervening narrow strips of said plate material, and means for supporting on a flat surface said bent plate in inverted V position, the record engaging confronting edges of each said slot being of substantially non-abrasive material, said rack adapted to receive a disc record in each said slot opening with the record engaging, by peripheral edge portions thereof which are relatively spaced apart substantially less than a half circle, with record supporting elements of the rack at the two ends of the slot and disposed in the plane thereof.

FRANK D. SLOUGH.